(12) United States Patent
Li (10) Patent No.: US 12,396,450 B2
(45) Date of Patent: Aug. 26, 2025

(54) PORTABLE MOSQUITO-CONTROL VOLATILIZATION APPARATUS

(71) Applicant: Wenjie Li, Guangzhou (CN)

(72) Inventor: Wenjie Li, Guangzhou (CN)

(\*) Notice: Subject to any disclaimer, the term of this patent is extended or adjusted under 35 U.S.C. 154(b) by 0 days.

(21) Appl. No.: 18/660,599

(22) Filed: May 10, 2024

(65) Prior Publication Data
US 2024/0298630 A1   Sep. 12, 2024

(30) Foreign Application Priority Data

Mar. 12, 2024 (CN) .......................... 202410280690.4

(51) Int. Cl.
| | |
|---|---|
| *A01M 29/12* | (2011.01) |
| *A01M 1/20* | (2006.01) |
| *A01N 25/18* | (2006.01) |
| *A01N 35/02* | (2006.01) |
| *A01N 37/18* | (2006.01) |
| *A01N 37/20* | (2006.01) |
| *A01N 43/40* | (2006.01) |
| *A01P 17/00* | (2006.01) |
| *B65D 43/12* | (2006.01) |

(52) U.S. Cl.
CPC .......... *A01M 29/12* (2013.01); *A01M 1/2055* (2013.01); *A01N 25/18* (2013.01); *A01N 35/02* (2013.01); *A01N 37/18* (2013.01); *A01N 37/20* (2013.01); *A01N 43/40* (2013.01); *A01P 17/00* (2021.08); *B65D 43/12* (2013.01)

(58) Field of Classification Search
CPC ...... A01M 1/2055; A01M 29/12; B65D 43/12
See application file for complete search history.

(56) References Cited

U.S. PATENT DOCUMENTS

| | | | | |
|---|---|---|---|---|
| 2,102,094 | A * | 12/1937 | Romig ................... | B65D 43/12 220/351 |
| 2,295,747 | A * | 9/1942 | Mills ..................... | B65D 43/12 220/351 |
| 2,463,586 | A * | 3/1949 | Anderson ............. | B65D 43/12 220/351 |
| 3,782,584 | A * | 1/1974 | Swenson ............... | B65D 43/12 215/209 |

(Continued)

FOREIGN PATENT DOCUMENTS

CN          116829247 A        9/2023

*Primary Examiner* — Christopher D Hutchens
(74) *Attorney, Agent, or Firm* — Maier & Maier, PLLC (57) ABSTRACT

A portable mosquito-control volatilization apparatus, including a box body having an opening, an adsorption structure arranged inside the box body and configured to adsorb a repellent, and a protective-cover structure detachably assembled at the opening to cover the adsorption structure and configured to leak or cover a volatile gas generated by the repellent. After the box body is arranged with the adsorption structure that adsorbs the repellent, the volatilization of the repellent can be achieved. At the same time, the protective-cover structure can cover the adsorption structure to prevent the adsorption structure from detaching from the box body, without the need to paint the repellent on the skin, effectively avoiding a contact between the repellent and the user's skin, thereby avoiding the sticky discomfort, safety hazard, and quick volatilization leading to waste all caused by the direct contact between the repellent and the skin.

6 Claims, 5 Drawing Sheets

(56) References Cited

U.S. PATENT DOCUMENTS

| | | | | |
|---|---|---|---|---|
| 3,804,330 A | * | 4/1974 | Miller, Jr. | A01M 1/2055 |
| | | | | 239/34 |
| 2006/0027468 A1 | * | 2/2006 | Berar | B65D 83/0805 |
| | | | | 206/494 |
| 2007/0181054 A1 | * | 8/2007 | Adair | G01N 31/229 |
| | | | | 116/207 |
| 2008/0141928 A1 | * | 6/2008 | Adair | A01M 1/2044 |
| | | | | 116/206 |
| 2014/0338614 A1 | * | 11/2014 | Grubaugh | A01K 29/00 |
| | | | | 119/712 |
| 2015/0101547 A1 | * | 4/2015 | McIntyre | A01M 29/12 |
| | | | | 119/712 |
| 2017/0340765 A1 | | 11/2017 | Adair et al. | |
| 2018/0116198 A1 | * | 5/2018 | Manhas | A01M 1/2033 |
| 2023/0011344 A1 | | 1/2023 | Trias Lafuente et al. | |

\* cited by examiner

PORTABLE MOSQUITO-CONTROL VOLATILIZATION APPARATUS

CROSS-REFERENCES TO RELATED APPLICATIONS

This application claims priority to Chinese Patent Application No. 202410280690.4, filed on Mar. 12, 2024, the content of all of which is incorporated herein by reference.

TECHNICAL FIELD

The present disclosure relates to the technical field of mosquito-control apparatuses, in particular to a portable mosquito-control volatilization apparatus.

BACKGROUND

Mosquito repelling is one of the issues that cannot be ignored in daily life. In order to reduce the impact on users while controlling mosquitoes, a mildly-toxic repellent such as DEET is commonly used for mosquito control.

In the prior art, an application of the repellent is usually limited to spraying or painting. In order to achieve a better diffusion effect, the above-mentioned methods require adding volatilization stuff such as alcohol, glycerol, etc. into the repellent to promote volatilization and diffusion effects. However, it may cause sticky discomfort on the skin, and may also have safety hazard for people with sensitive skin; at the same time, the repellent painted on the user's skin volatilizes quickly, leading to waste.

Therefore, the prior art still needs to be improved and developed.

SUMMARY

According to the above-mentioned defects of the prior art, the present disclosure provides a portable mosquito-control volatilization apparatus, aiming to solve the technical problem that the repellent is directly painted on the skin in the prior art leading to safety hazard and repellent waste.

The technical schemes adopted by the present disclosure to solve the above-mentioned technical problem are as follows.

A portable mosquito-control volatilization apparatus includes:
  a box body, having an opening;
  an adsorption structure, arranged inside the box body, and configured to adsorb a repellent; and
  a protective-cover structure, detachably assembled at the opening to cover the adsorption structure, and configured to leak or cover a volatile gas generated by the repellent.

In one implementation, the protective-cover structure includes:
  a protective-cover body, detachably in a slide fit with the box body to cover or open the opening;
  the protective-cover body is in a clearance fit with the box body to leak the volatile gas generated by the repellent.

In one implementation, the protective-cover structure further includes:
  a protective-cover guide-rail mechanism, arranged at one side of the protective-cover body close to the box body; a sliding direction of the protective-cover guide-rail mechanism is parallel to a sliding direction of the protective-cover body;
  an outer edge of the box body is arranged with a box-body guide-rail mechanism, and the box-body guide-rail mechanism is configured to be in a slide fit with the protective-cover guide-rail mechanism.

In one implementation, the protective-cover guide-rail mechanism includes two protective-cover guide rails, and the two protective-cover guide rails are arranged at two sides of the protective-cover body and are symmetrical to each other; the protective-cover guide rail includes:
  a connecting portion; one end of the connecting portion is connected to the protective-cover body, and another end of the connecting portion is bent relative to the protective-cover body and arranged extending away from the protective-cover body; and
  a sliding portion, arranged at one end of the connecting portion away from the protective-cover body and opposite to the protective-cover body; a gap is formed between the sliding portion and the protective-cover body, and the gap is configured to accommodate the box-body guide-rail mechanism; a shape of the sliding portion is a circular arc.

In one implementation, the box-body guide-rail mechanism includes two box-body guide rails, the two box-body guide rails are arranged at two sides of the box body and are symmetrical to each other, and a shape of the box-body guide rail is a circular arc.

In one implementation, in two ends of the protective-cover body both parallel to a sliding direction, only one end is arranged with a protective-cover clamping portion; a position of the box body corresponding to the protective-cover clamping portion is arranged with a box-body clamping portion; when the protective-cover clamping portion is clamped with the box-body clamping portion, the protective-cover body fully covers the opening.

In one implementation, the protective-cover structure further includes:
  a protrusion portion, arranged at one end of the protective-cover body close to the protective-cover clamping portion; when the protective-cover clamping portion is clamped with the box-body clamping portion, at least a part of the protrusion portion extends inside the opening.

In one implementation, the repellent is selected from the group consisting of picaridine, BAAPE, DEET, and methyl nonyl ketone.

In one implementation, the protective-cover structure further includes:
  a breathable-film layer, arranged on the box body, and covers the opening; and
  a sealing-film layer, detachably covering the breathable-film layer.

In one implementation, the portable mosquito-control volatilization apparatus further includes:
  a heating structure, having a heating groove; the heating groove is configured to accommodate and heat the box body.

In the present disclosure, after the box body is arranged with the adsorption structure that adsorbs the repellent, the volatilization of the repellent can be achieved. At the same time, the protective-cover structure can cover the adsorption structure to prevent the adsorption structure from detaching from the box body, without the need to paint the repellent on the skin, effectively avoiding a contact between the repellent and the user's skin, thereby avoiding the sticky discomfort, safety hazard, and quick volatilization leading to waste all caused by the direct contact between the repellent and the skin.

DETAILED DESCRIPTION OF EMBODIMENTS

In order to make the purposes, technical schemes, and effects of the present disclosure clearer and more explicit, the present disclosure is further described in detail below with reference to the accompanying drawings and embodiments. It should be understood that the specific embodiments described here are only intended to explain the present disclosure and are not intended to limit the present disclosure.

Figure 1:
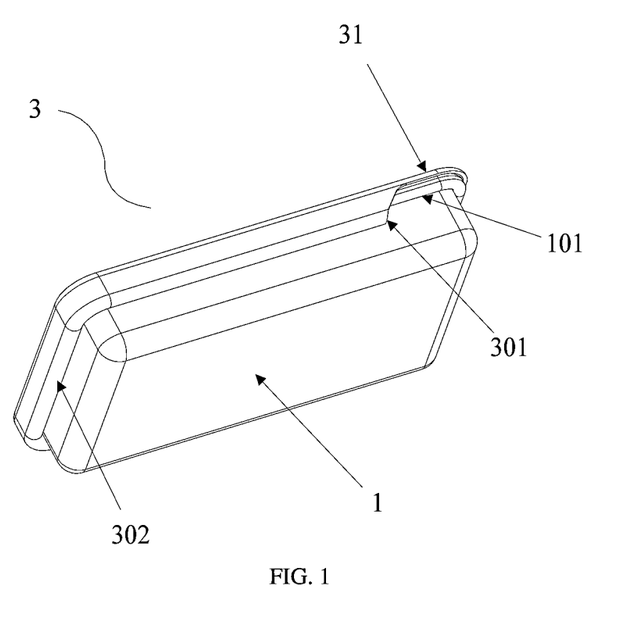
FIG. 1 is a first view of a portable mosquito-control volatilization apparatus when an opening is fully covered by a protective-cover structure in embodiment 1 of the present disclosure.
Figure 2:
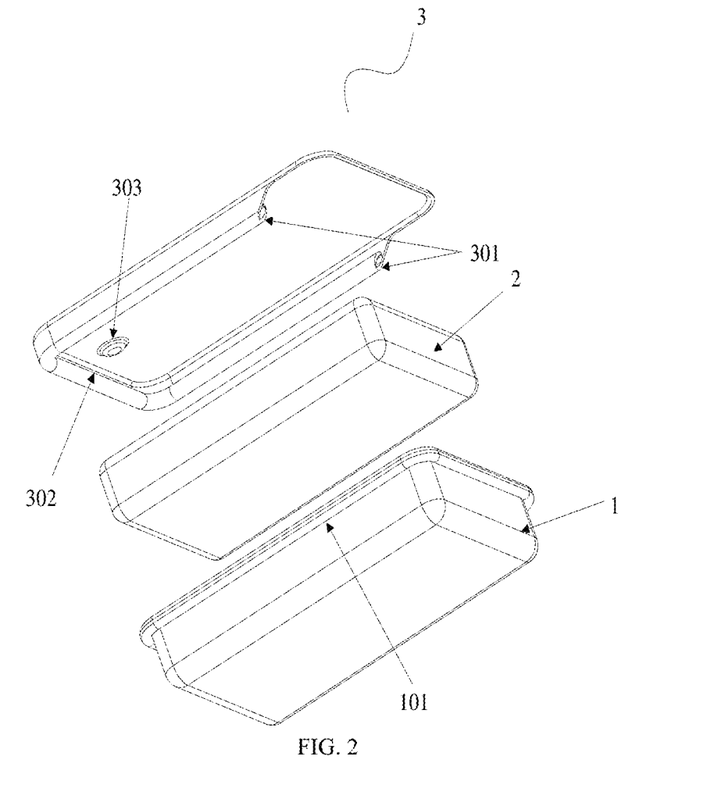
FIG. 2 is a schematic diagram of a breakdown structure of the portable mosquito-control volatilization apparatus in the embodiment 1 of the present disclosure.
Figure 11:
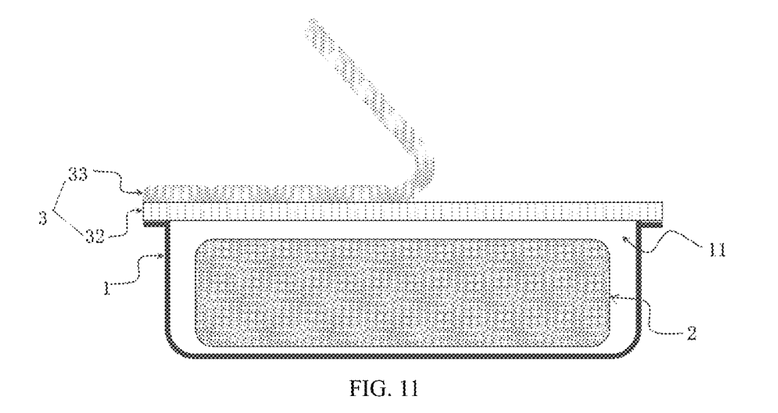
FIG. 11 is a reference diagram of a usage state of the portable mosquito-control volatilization apparatus when the sealing-film layer is partially torn open in the embodiment 2 of the present disclosure.

The present disclosure provides a portable mosquito-control volatilization apparatus, as shown in FIGS. 1, 2, and 11. The portable mosquito-control volatilization apparatus includes a box body 1, an adsorption structure 2, and a protective-cover structure 3. The adsorption structure 2 is arranged inside the box body 1 and is configured to adsorb a repellent. The box body 1 has an opening 11, the opening 11 is used for the adsorption structure 2 being placed and taken out, and is further used for the repellent volatilizing outward and supplementing the repellent to the adsorption structure 2. The protective-cover structure 3 is detachably assembled at the opening 11 to cover the adsorption structure 2, and to leak or cover a volatile gas generated by the repellent.

In the present disclosure, the adsorption structure 2 is configured to adsorb the repellent, and the box body 1 is configured to accommodate the adsorption structure 2, so that when a user carries the portable mosquito-control volatilization apparatus, the repellent is not carried in liquid form, thereby effectively avoiding the overflow and spill of the repellent. When the protective-cover structure 3 cooperates with the box body 1, the adsorption structure 2 can be covered, thereby preventing the adsorption structure 2 from detaching from the box body 1. Meanwhile, the cooperation structure of the protective-cover structure 3 and the box body 1 can meet the volatilization of the repellent without the need to open the protective-cover structure 3, and can also meet the volatilization of the repellent after actively adjusting the protective-cover structure 3. Therefore, in the present disclosure, since the adsorption structure 2 configured to adsorb the repellent is arranged in the box body 1, the volatilization of the repellent can be achieved without the need to paint the repellent to the skin, effectively avoiding a contact between the repellent and the user's skin, thereby avoiding the sticky discomfort, safety hazard, and quick volatilization leading to waste all caused by the direct contact of the repellent with the skin.

The repellent is selected from the group consisting of picaridine, BAAPE, DEET, and methyl nonyl ketone.

Embodiment 1

When the protective-cover structure 3 cooperates with the box body 1, the cooperation is a clearance fit, i.e. when the opening 11 is covered by the protective-cover structure 3, there is no airtightness between the protective-cover structure 3 and the box body 1, so that the gas generated by the volatilization of the repellent can directly leak from between the protective-cover structure 3 and the box body 1, and reduce the contact area between the repellent and the air, achieving portability and ease of use and extending the shelf life.

Embodiment 2

When the protective-cover structure 3 cooperates with the box body 1 and covers the opening 11, the opening 11 is fully sealed, and the gas generated by the volatilization of the repellent is covered by the protective-cover structure 3 and cannot be discharged from the box body 1. Only by disassembling the protective-cover structure 3 to a certain extent can the gas generated by the volatilization of the repellent be leaked, thereby repelling mosquitoes and insects.

Based on the above embodiment 1, as shown in FIGS. 1-9, the protective-cover structure 3 includes a protective-cover body 31, the protective-cover body 31 and the box body 1 are detachably in a slide fit to cover or open the opening 11. That is to say, by sliding the protective-cover body 31 to change a relative position between the protective-cover body 31 and the box body 1, the protective-cover body 31 can be closed and opened, thereby covering or opening the opening 11. The protective-cover body 31 and the box body 1 are in a clearance fit to achieve the leakage of the gas generated by the volatilization of the repellent without the need to open the protective-cover body 31, and to prevent users from directly contacting the repellent due to incorrect operation.

The protective-cover structure 3 further includes a protective-cover guide-rail mechanism, which is arranged at one side of the protective-cover body 31 close to the box body 1. A sliding direction of the protective-cover guide-rail mechanism is parallel to a sliding direction of the protective-cover body 31. An outer edge of the box body 1 is further arranged with a box-body guide-rail mechanism, the box-body guide-rail mechanism is configured to be in a slide fit with the protective-cover guide-rail mechanism.

In the present disclosure, the slide fit between the protective-cover structure 3 and the box body 1 is achieved through the cooperation between the protective-cover guide-rail mechanism and the box-body guide-rail mechanism, thereby facilitating the assembly and disassembly of the protective-cover structure 3 on the box body 1. Even when users need to expand the anti-mosquito effect of the portable mosquito-control volatilization apparatus, they can slide the protective-cover body 31 to make the protective-cover body 31 relatively staggered with the opening 11, and expose one part of the opening 11, thereby not only increasing the volatilization area of the gas, but also avoiding the adsorption structure 2 from detaching from the opening 11.

Figure 3:
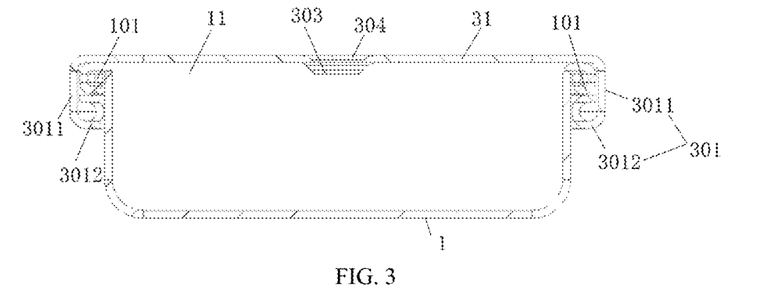
FIG. 3 is a first cross-sectional view of the portable mosquito-control volatilization apparatus when the opening is fully covered by the protective-cover structure in the embodiment 1 of the present disclosure.
Figure 4:
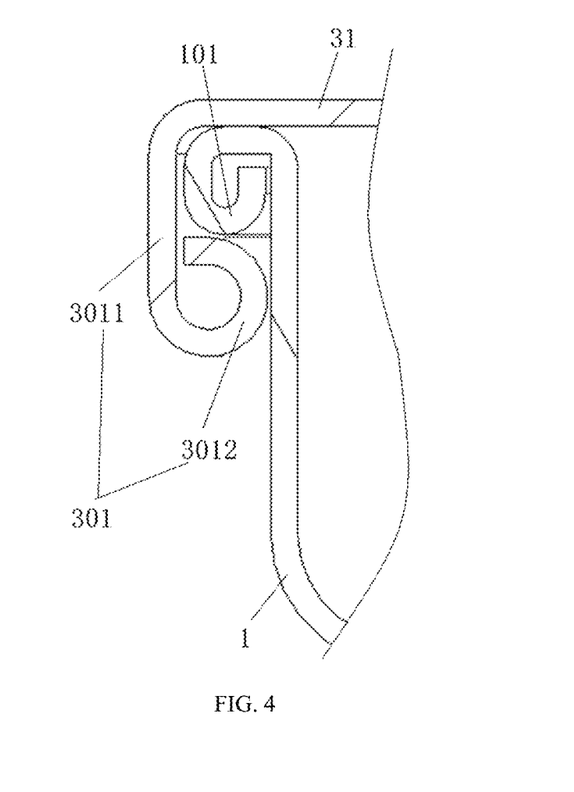
FIG. 4 is a reference diagram of a usage state when a protective-cover guide rail and a box-body guide rail are in a slide fit in the embodiment 1 of the present disclosure.

The protective-cover guide-rail mechanism includes two protective-cover guide rails 301, as shown in FIGS. 2, 3, and 4. The two protective-cover guide rails 301 are arranged at two sides of the protective-cover body 31 and are symmetrical to each other. The box-body guide-rail mechanism includes two box-body guide rails 101, which are arranged at two sides of the box body 1 and are symmetrical to each other. The box-body guide rail 101 corresponds one-to-one with the protective-cover guide rail 301 and is in a slide fit with the protective-cover guide rail 301. By the slide fit between the protective-cover guide rail 301 and the box-body guide rail 101, the protective-cover body 31 can be repeatedly opened and closed at the opening 11, thereby placing and replacing the adsorption structure 2, and adding and supplementing the repellent. When the portable mosquito-control volatilization apparatus is not in use, by assembling and sliding the protective-cover body 31, the protective-cover body 31 can cover the adsorption structure 2, so as to avoid users from accidentally touching the repellent inside the adsorption structure 2. When the content of the repellent is insufficient, users can autonomously add the repellent to the adsorption structure 2 by sliding out the protective-cover body 31 in a side-direction.

As shown in FIGS. 3 and 4, the protective-cover guide rail 301 includes a connecting portion 3011 and a sliding portion 3012. One end of the connecting portion 3011 is connected to the protective-cover body 31, and another end of the connecting portion 3011 is bent relative to the protective-cover body 31 and arranged extending away from the protective-cover body 31. The sliding portion 3012 is arranged at one end of the connecting portion 3011 away from the protective-cover body 31 and opposite to the protective-cover body 31. Correspondingly, the box-body guide-rail mechanism includes two box-body guide rails 101, which are arranged at two sides of the box body 1 and are symmetrical to each other.

The box-body guide rail 101 corresponds one-to-one with the protective-cover guide rail 301. The sliding portion 3012 is configured to be in a slide fit with the box-body guide rail 101. The connecting portion 3011 is configured to connect the sliding portion 3012 with the protective-cover body 31. Moreover, there is a gap between the sliding portion 3012 and the protective-cover body 31, the gap is configured to accommodate the box-body guide-rail mechanism. When the protective-cover guide rail 301 correspondingly cooperates with the box-body guide rail 101, the box-body guide rail 101 is located between the corresponding sliding portion 3012 and the protective-cover body 31, and can slide back and forth inside the gap to achieve the closure and opening of the opening 11.

In one implementation of the present embodiment, a shape of the sliding portion 3012 is a circular arc, so that when the sliding portion 3012 contacts the box-body guide rail 101, the contact thereof is a line contact, reducing the contact area between the sliding portion 3012 and the box-body guide rail 101, reducing the friction resistance of the relative sliding between the protective-cover guide rail 301 and the box-body guide rail 101, thereby improving the convenience of opening and closing the protective-cover structure 3.

In one implementation of the present embodiment, a shape of the box-body guide rail 101 is also a circular arc to further reduce the contact area between the box-body guide rail 101 and the protective-cover guide rail 301, reducing the friction resistance of the relative sliding between the protective-cover guide rail 301 and the box-body guide rail 101, thereby improving the convenience of opening and closing the protective-cover structure 3.

Figure 5:
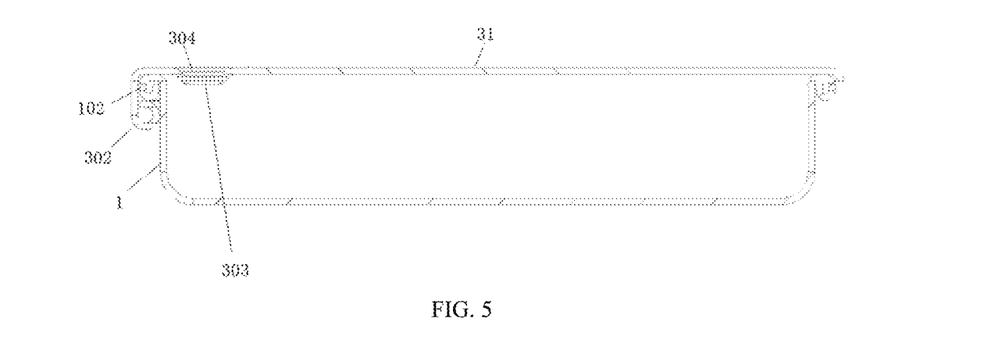
FIG. 5 is a second cross-sectional view of the portable mosquito-control volatilization apparatus when the opening is fully covered by the protective-cover structure in the embodiment 1 of the present disclosure.
Figure 6:
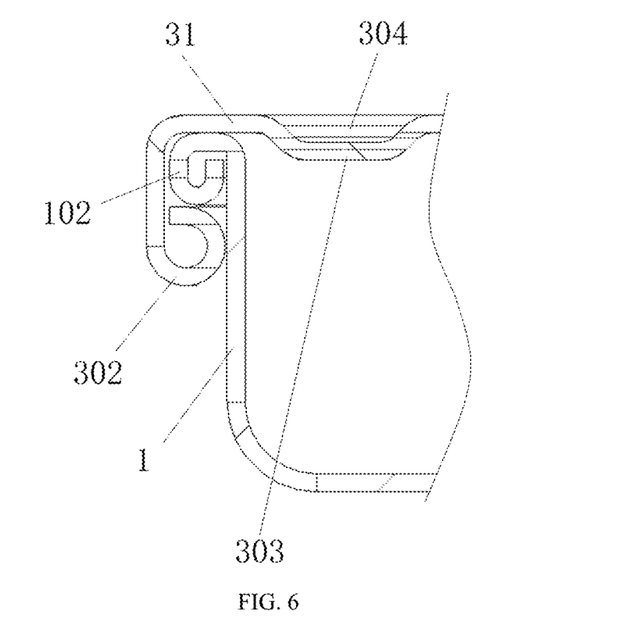
FIG. 6 is a reference diagram of a usage state when a protective-cover clamping portion and a box-body clamping portion are clamped together in the embodiment 1 of the present disclosure.
Figure 7:
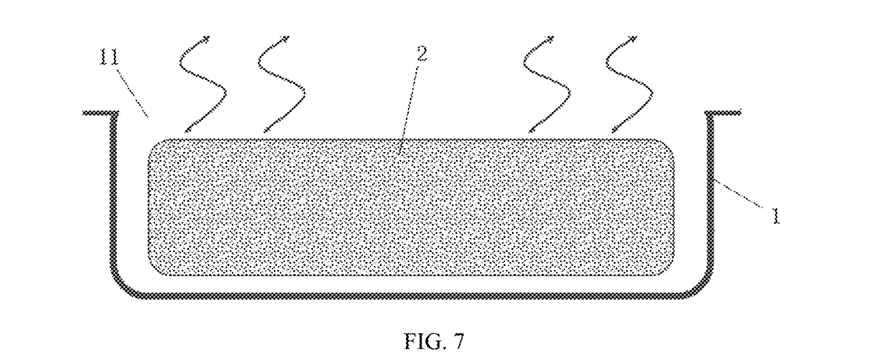
FIG. 7 is a reference diagram of a usage state of the portable mosquito-control volatilization apparatus when the opening is fully opened in the embodiment 1 of the present disclosure.
Figure 8:
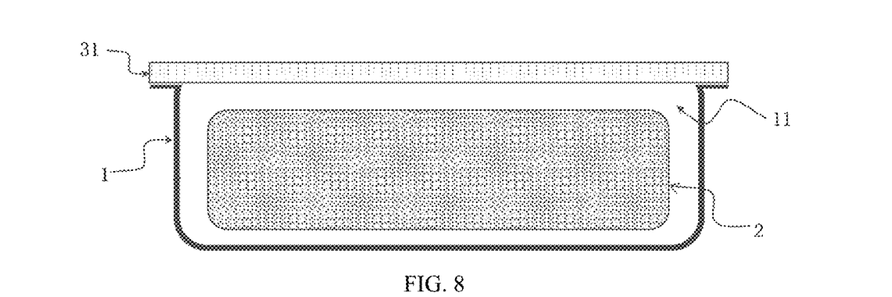
FIG. 8 is a second view of the portable mosquito-control volatilization apparatus when the opening is fully covered by the protective-cover structure in the embodiment 1 of the present disclosure.
Figure 9:
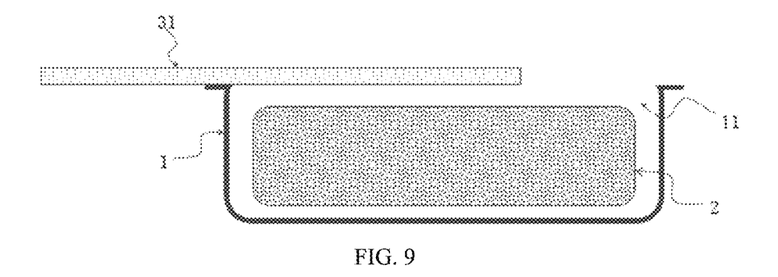
FIG. 9 is a reference diagram of a usage state of the portable mosquito-control volatilization apparatus when the opening is partially opened in the embodiment 1 of the present disclosure.

In the present embodiment, as shown in FIGS. 5 and 6, in two ends of the protective-cover body 31 both parallel to the sliding direction, only one end is arranged with a protective-cover clamping portion 302, and the other end is not arranged with the protective-cover clamping portion 302, so that along the sliding direction, the one end of the protective-cover body 31 arranged with the protective-cover clamping portion 302 has a stop effect. The other end of the protective-cover body 31 not arranged with the protective-cover clamping portion 302 is as a sliding entrance, allowing the box-body guide rail 101 to be inserted into the gap, thereby cooperating the box-body guide rail 101 with the protective-cover guide rail 301 to achieve the sliding, opening, and closing of the protective-cover body 31.

A position of the box body 1 corresponding to the protective-cover clamping portion 302 is arranged with a box-body clamping portion 102. When the protective-cover clamping portion 302 is clamped with the box-body clamping portion 102, the protective-cover body 31 fully covers the opening 11.

It can be understood that after adding the repellent to the adsorption structure 2, the box-body guide rail 101 is inserted into the gap from one end of the protective-cover body 31 not arranged with the protective-cover clamping portion 302, and the protective-cover body 31 is slidden relative to the box body 1, so that the protective-cover clamping portion 302 moves toward the box-body clamping portion 102 until the protective-cover clamping portion 302 is clamped with the box-body clamping portion 102, thus the closure of the protective-cover body 31 is completed, and the opening 11 is fully covered. When it is necessary to open the protective-cover body 31, the protective-cover body 31 is slidden relative to the box body 1, so that the protective-cover clamping portion 302 moves away from the box-body clamping portion 102. As the protective-cover clamping portion 302 moves away, the opening 11 gradually opens.

Meanwhile, the cooperation of the box-body guide rail 101 and the protective-cover guide rail 301 can not only achieve a sliding guidance for both, but also limit the protective-cover body 31 in an arrangement direction of both the box body 1 and the protective-cover body 31, so that the protective-cover body 31 can only slide, open, and close, and cannot open and close in the arrangement direction of both the box body 1 and the protective-cover body 31, further reducing the probability of opening the protective-cover body 31 due to accidental touch.

One part of the protective-cover clamping portion 302 is bent relative to the protective-cover body 31, thereby forming one accommodating space between it and the protective-cover body 31. When the protective-cover clamping portion 302 is clamped with the box-body clamping portion 102, the box-body clamping portion 102 is located inside the accommodating space.

In one implementation of the present embodiment, as shown in FIGS. 2, 3, and 6, the protective-cover structure 3 further includes a protrusion portion 303. The protrusion portion 303 is located at one end of the protective-cover body 31 close to the protective-cover clamping portion 302. When the protective-cover clamping portion 302 is clamped with the box-body clamping portion 102, at least one part of the protrusion portion 303 extends inside the opening 11, so that the protrusion portion 303 and the protective-cover clamping portion 302 limit the protective-cover body 31 from the inside and the outside of the box body 1, respectively, so as to avoid abnormally opening the protective-cover body 31 due to accidental touch.

The protective-cover guide rail 301 is arranged in a length direction of the protective-cover body 31, and the protrusion portion 303 is located at a center of a width direction of the protective-cover body 31. When the protective-cover clamping portion 302 is clamped with the box-body clamping portion 102, along a sliding direction of the protective-cover body 31, there is a crack between the protrusion portion 303 and one end of the box body 1 arranged with the box-body clamping portion 102, so that under the dual limiting action of the protective-cover clamping portion 302 and the protrusion portion 303, the protective-cover clamping portion 302 can move a certain distance away from the box-body clamping portion 102 until the protrusion portion 303 contacts and limits the box body 1. At this time, the opening 11 can open the distance of the crack, thereby expanding the surface area of the outward volatilization of the repellent and improving the volatilization performance of the repellent.

It should be noted that the size of the crack is much smaller than that of the adsorption structure 2, ensuring that when the protrusion portion 303 contacts the box body 1 to open one part of the opening 11, there is no need to worry about the adsorption structure 2 detaching from the opening 11.

In one implementation of the present embodiment, as shown in FIGS. 3, 5, and 6, a groove portion 304 is arranged at one side of the protective-cover body 31 deviating from the protrusion portion 303. The groove portion 304 is arranged correspondingly with the protrusion portion 303 to facilitate the user to push and pull the protective-cover body 31 through the groove portion 304, thereby achieving convenient operation of opening and closing the opening 11.

Figure 10:
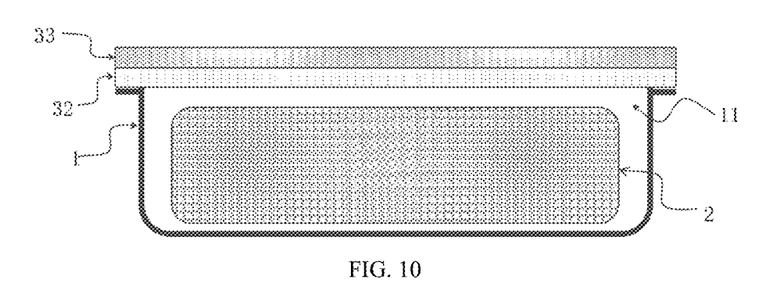
FIG. 10 is a reference diagram of a usage state of a portable mosquito-control volatilization apparatus when a sealing-film layer is not torn open in embodiment 2 of the present disclosure.
Figure 12:
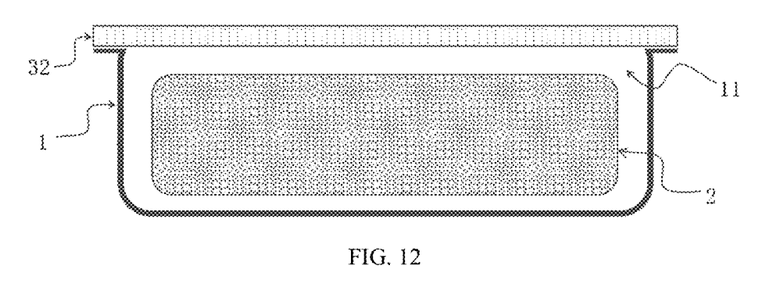
FIG. 12 is a reference diagram of a usage state of the portable mosquito-control volatilization apparatus when the sealing-film layer is fully torn open in the embodiment 2 of the present disclosure.

Based on the above embodiment 2, as shown in FIGS. 10 and 11, the protective-cover structure 3 includes a breathable-film layer 32 and a sealing-film layer 33. The breathable-film layer 32 is arranged on the box body 1 and covers the opening 11. The sealing-film layer 33 detachably covers on the breathable-film layer 32. When both the breathable-film layer 32 and the sealing-film layer 33 are intact (as shown in FIG. 10), the opening 11 is in a sealed state. When mosquito repelling is required, the sealing-film layer 33 is torn open (as shown in FIG. 11, the sealing-film layer 33 is only partially torn open; or as shown in FIG. 12, the sealing-film layer 33 is fully torn open), and the volatile gas inside the box 1 can diffuse into the air through the breathable-film layer 32, thereby achieving the mosquito-repelling effect.

The breathable-film layer 32 has multiple hole-shaped structures, making the active-substance gas generated by the volatilization of the repellent diffuse into the air from an inner cavity of the box body 1 through the hole-shaped structure, and effectively preventing the liquid-leaking problem of the repellent inside the box body 1, while avoiding the direct contact between users and the repellent.

The sealing-film layer 33 is a tearable sealing film (such as aluminum film, PET film, etc.). The sealing-film layer 33 has an airtight performance, which prevents the active-substance gas generated by the volatilization of the repellent from diffusing into the air from the box body 1. Therefore, when the sealing-film layer 33 is not torn open, it can effectively prevent weakened efficacy caused by the diffusion of the volatile gas generated by the repellent inside the box body 1 during storage, which is beneficial for extending the shelf life of the product. Users can start using the product immediately by removing the sealing-film layer 33 before use (open to instant use), thereby reducing the users' learning costs and achieving portability and ease of use.

Whether based on the above embodiment 1 or embodiment 2, an indicator may be added to the adsorption structure 2. The indicator is selected from the group consisting of a color-type rate indicator, a smell-type rate indicator, and a temperature indicator.

The color-type rate indicator has a similar volatilization rate to the repellent, and can diffuse into the air with the repellent. Users can determine the remaining content of the repellent inside the box body 1 by observing the color darkness change at the adsorption structure 2. The smell-type rate indicator has a similar volatilization rate to the repellent, has a distinct smell (such as lemon smell, eucalyptus-citriodora smell, etc.), and can diffuse into the air with the repellent. Users can determine the remaining content of the repellent in the box body 1 by observing the smell change at the adsorption structure 2. The temperature indicator can have color change by sensing temperature change inside the box body 1, providing reference information about the remaining content of the repellent. Users can determine the remaining content of the repellent in the box body 1 by the degree of color change at the adsorption structure 2.

It should be noted that the color-type rate indicator, the smell-type rate indicator, and the temperature indicator may be used alone or in any combination to facilitate users to estimate the remaining content of the repellent inside the box body 1.

The portable mosquito-control volatilization apparatus further includes a heating structure, and the heating structure has a heating groove. The heating groove is configured to accommodate and heat the box body 1, thereby improving the volatilization performance of the repellent, enabling the repellent to volatilize at a faster speed and diffuse into the air, shortening the effective time of the active substance inside the repellent, and improving the user experience.

In the present disclosure, the heating structure may be individually combined with the box body 1 and heat the box body 1, and may further be combined with an electronic anti-mosquito device, thereby making the portable mosquito-control volatilization apparatus a consumable for the electronic anti-mosquito device.

In addition, the portable mosquito-control volatilization apparatus further includes a temperature-detecting structure, which is arranged inside the heating groove to detect temperature inside the heating groove. When the temperature inside the heating groove is lower than a target temperature, the heating structure is opened and heats the box body 1. When the temperature inside the heating groove reaches the target temperature, the heating structure closes.

Whether based on the above embodiment 1 or embodiment 2, the adsorption structure 2 may include a sponge adsorption structure 2, a gel adsorption structure 2, a reticular-cellulose-substrate adsorption structure 2, a waxy-material adsorption structure 2, or a polymer-material adsorption structure 2.

It should be understood that the applications of the present disclosure are not limited to the above-mentioned embodiments. Those ordinary skilled in the art can make modifications or transformations according to the above description, and all of these modifications and transformations should fall within the protection scope of the claims attached to the present disclosure.

What is claimed is:

1. A portable mosquito-control volatilization apparatus, comprising:
   a box body having an opening;
   an adsorption structure, arranged inside the box body, and configured to adsorb a repellent; and
   a protective-cover structure, detachably assembled at the opening to cover the adsorption structure, and configured to leak or cover a volatile gas generated by the repellent, wherein the protective-cover structure comprises:
   a protective-cover body, detachably in a slide fit with the box body to cover or open the opening, wherein in two ends of the protective-cover body both parallel to a sliding direction, only one end is arranged with a protective-cover clamping portion; a position of the box body corresponding to the protective-cover clamping portion is arranged with a box-body clamping portion; and, when the protective-cover clamping portion is clamped with the box-body clamping portion, the protective-cover body fully covers the opening; and
   a protrusion portion arranged at one end of the protective-cover body close to the protective-cover clamping portion,
   wherein the protective-cover body is in a clearance fit with the box body to leak the volatile gas generated by the repellent;
   wherein, when the protective-cover clamping portion is clamped with the box-body clamping portion, at least a part of the protrusion portion extends inside the opening, and a crack is formed between the protrusion portion and one end of the box body arranged with the box-body clamping portion;
   wherein, the protective-cover clamping portion is movable a certain distance away from the box-body clamping portion until the protrusion portion contacts and limits the box body; and
   wherein, the opening opens the distance of the crack, thereby expanding the surface area of the outward volatilization of the repellent and improving the volatilization performance of the repellent.

2. The portable mosquito-control volatilization apparatus according to claim 1, wherein the protective-cover structure further comprises:
   a protective-cover guide-rail mechanism arranged at one side of the protective-cover body close to the box body; wherein a sliding direction of the protective-cover guide-rail mechanism is parallel to a sliding direction of the protective-cover body; and
   an outer edge of the box body is arranged with a box-body guide-rail mechanism, and the box-body guide-rail mechanism is configured to be in a slide fit with the protective-cover guide-rail mechanism.

3. The portable mosquito-control volatilization apparatus according to claim 2, wherein the protective-cover guide-rail mechanism comprises two protective-cover guide rails, and the two protective-cover guide rails are arranged at two sides of the protective-cover body and are symmetrical to each other; the protective-cover guide rail comprising:
   a connecting portion; wherein one end of the connecting portion is connected to the protective-cover body, and another end of the connecting portion is bent relative to the protective-cover body and arranged extending away from the protective-cover body; and
   a sliding portion arranged at one end of the connecting portion away from the protective-cover body and opposite to the protective-cover body; wherein a gap is formed between the sliding portion and the protective-cover body, and the gap is configured to accommodate the box-body guide-rail mechanism; a shape of the sliding portion is a circular arc.

4. The portable mosquito-control volatilization apparatus according to claim 2, wherein the box-body guide-rail mechanism comprises two box-body guide rails, the two box-body guide rails are arranged at two sides of the box body and are symmetrical to each other, and a shape of the box-body guide rail is a circular arc.

5. The portable mosquito-control volatilization apparatus according to claim 1, wherein the repellent is selected from the group consisting of: picaridine, BAAPE, DEET, and methyl nonyl ketone.

6. The portable mosquito-control volatilization apparatus according to claim 1, wherein the protective-cover structure further comprises:
   a breathable-film layer, arranged on the box body, that covers the opening; and
   a sealing-film layer, detachably covering the breathable-film layer.

* * * * *